US012198071B2

(12) United States Patent
Gubbi Lakshminarasimha et al.

(10) Patent No.: US 12,198,071 B2
(45) Date of Patent: Jan. 14, 2025

(54) SYSTEM AND METHOD FOR DYNAMICALLY GENERATING COMPOSABLE WORKFLOW FOR MACHINE VISION APPLICATION-BASED ENVIRONMENTS

(71) Applicant: Tata Consultancy Services Limited, Mumbai (IN)

(72) Inventors: Jayavardhana Rama Gubbi Lakshminarasimha, Bangalore (IN); Balamuralidhar Purushothaman, Bangalore (IN); Vartika Sengar, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 791 days.

(21) Appl. No.: 17/476,512

(22) Filed: Sep. 16, 2021

(65) Prior Publication Data
US 2023/0016233 A1    Jan. 19, 2023

(30) Foreign Application Priority Data
Jun. 8, 2021    (IN) .............................. 202121025523

(51) Int. Cl.
*G06N 5/02*    (2023.01)
*G06N 5/04*    (2023.01)
(Continued)

(52) U.S. Cl.
CPC ............... *G06N 5/04* (2013.01); *G06N 20/00* (2019.01)

(58) Field of Classification Search
USPC ................. 128/920, 922–925; 382/100–132, 382/154–159; 704/1–275; 706/1–62,
(Continued)

(56) References Cited

U.S. PATENT DOCUMENTS 8,473,447 B2 *    6/2013   Yoon ....................... G06N 5/045
                                                    702/181
9,152,870 B2 *   10/2015   Sawhney ............... G06V 10/96
(Continued)

FOREIGN PATENT DOCUMENTS

WO    WO 2018/053187 A1    3/2018

OTHER PUBLICATIONS

Eppe et al., "From semantics to execution: Integrating action planning with reinforcement learning for robotic causal problem-solving," (2019).

(Continued)

*Primary Examiner* — Marcellus J Augustin
(74) *Attorney, Agent, or Firm* — Finnegan, Henderson, Farabow, Garrett & Dunner, LLP

(57) ABSTRACT

Automation is the key to build efficient workflows with minimum effort consumption. However, there is a large gap in workflow synthesis for automated AI application development. Computer vision workflow synthesis largely rely on domain expert due to lack of generalization over solution search space for given goal. This search space for creating suitable solution(s) using available algorithms is quite vast, which makes exploratory work of solution building a time-, effort- and intellect intensive endeavor. Embodiments of the present disclosure provide system and method for goal-driven algorithm selection approach for building computer vision workflows on the fly. The system generates one or more task workflows with associated success probability depending on initial conditions and input natural language goal query by combining various image processing algorithms. Symbolic AI planning is aided by Reinforcement Learning to recommend optimal workflows that are robust and adaptive to changes in the environment.

12 Claims, 6 Drawing Sheets

(51) Int. Cl.
*G06N 7/02* (2006.01)
*G06N 20/00* (2019.01)
*G06V 10/10* (2022.01)
*G06V 10/20* (2022.01)
*G06V 10/40* (2022.01)
*G06V 10/96* (2022.01)

(58) Field of Classification Search
USPC .................................. 706/900–913, 924–931
See application file for complete search history.

(56) References Cited

U.S. PATENT DOCUMENTS

| | | | |
|---|---|---|---|
| 10,013,656 B1 * | 7/2018 | Ciarlini | G06F 9/46 |
| 12,051,276 B1 * | 7/2024 | Ulutan | G06V 40/10 |
| 12,067,644 B2 * | 8/2024 | Singh | G06N 3/006 |
| 2016/0217406 A1 * | 7/2016 | Najmi | G06Q 10/06315 |
| 2021/0141663 A1 * | 5/2021 | Deshpande | G06N 5/04 |
| 2021/0383259 A1 * | 12/2021 | Dmitriev | G06Q 10/0639 |
| 2023/0153682 A1 * | 5/2023 | Kojima | G06N 3/006 |
| | | | 706/12 |
| 2024/0118702 A1 * | 4/2024 | Cella | G05B 19/4155 |

OTHER PUBLICATIONS

Jiang et al., "Integrating Task-Motion Planning with Reinforcement Learning for Robust Decision Making in Mobile Robots," (2018).
Joo et al., "Autonomous Navigation Framework for Intelligent Robots Based on a Semantic Environment Modeling," (2020).
Silver et al., "PDDLGym: Gym Environments from PDDL Problems," (2020).

* cited by examiner

SYSTEM AND METHOD FOR DYNAMICALLY GENERATING COMPOSABLE WORKFLOW FOR MACHINE VISION APPLICATION-BASED ENVIRONMENTS

PRIORITY CLAIM

This U.S. patent application claims priority under 35 U.S.C. § 119 to: India Application No. 202121025523, filed on Jun. 8, 2021. The entire contents of the aforementioned application are incorporated herein by reference.

TECHNICAL FIELD

The disclosure herein generally relates to machine/computer vision, and, more particularly, to generating composable workflow for machine vision application-based environments.

BACKGROUND

Pattern recognition involves expert-guided algorithm selection at various stages of the solution workflow. For instance, pattern recognition in computer vision solutions is solved in different stages that include data transformation, pre-processing, region of interest detection, object detection, and metrology algorithms. Further, these stages may not be used in any specific order and use multiple machine learning algorithms. Besides, there exist multiple workflows that can yield good results under different constraints and the choice amongst those is critical for building an automatic workflow synthesis system.

The recommendation for the same task, for e.g., object detection, may need different kinds of workflows based on the environment setting, image capture device and image state. As an example, in the workflow for flange assembly inspection in railway lines, template matching should be recommended due to the detection of small-sized flange assembly. In another case of forest inventory inspection when drone images are available the optimal workflow may contain orthomosaic image formation and three-dimensional (3D) modeling followed by cluster analysis for tree location detection. Also, few algorithms might be robust to image conditions like noise, blur, etc. while some other need pre-processing with the appropriate parameter. In such diversity, it is difficult to synthesize machine vision solution workflows. As a result, the effort consumption and time to build new solutions increases enormously and is expert dependent.

SUMMARY

Embodiments of the present disclosure present technological improvements as solutions to one or more of the above-mentioned technical problems recognized by the inventors in conventional systems. For example, in one aspect, there is provided a processor implemented method for composable workflow for machine vision. The method comprises obtaining, via one or more hardware processors, an input comprising one or more input images and an input query, wherein the input query is one of a text description, a speech signal, or an annotated image; converting the input query to one or more goal states; creating, via the one or more hardware processors, a problem specification file in domain specific language based on (i) one or more initial states, (ii) one or more goal states and (iii) one or more characteristics associated with the one or more input images, and initializing the created problem specification file; creating, via the one or more hardware processors, a computer vision domain library based on an associated computer vision knowledge base, wherein the associated computer vision knowledge base comprises a computer vision knowledge structure to represent directory of one or more objects, one or more object types, one or more visual representation categories, one or more image attributes, one or more system states, and a plurality of computer vision algorithms for execution of one or more actions; automatically generating, via a planner executed by the one or more hardware processors, one or more action plans comprising a corresponding computer vision task workflow 'T' to be executed in a computer vision-based application environment by stitching the one or more actions comprised in the computer vision domain library to reach the one or more goal states (e.g., final goal states) specified in the problem specification file, wherein each of the one or more action plans comprises the computer vision task workflow 'T' to be executed, wherein the computer vision task workflow 'T' comprises one or more sub-tasks, wherein each of the one or more action plans are generated either deterministically or probabilistically, and wherein the step of generating one or more action plans comprises a probability of success in execution of the one or more action plans; executing the generated one or more action plans by executing the plurality of computer vision algorithms and the one or more actions comprised therein, wherein the step of executing the plurality of algorithms comprises sending an output from one computer vision algorithm to another computer vision algorithm; iteratively performing, until an optimal reward is reached: monitoring, via a reinforcement learning technique, the one or more actions associated with each of the one or more algorithms to determine a change in one or more states; and calculating, via the reinforcement learning technique, a cost for each of the one or more actions based on the change in the one or more states, wherein a reward is achieved by executing actions in the one or more action plans, wherein the reward is calculated either at the execution of each action in the one or more action plans or at the end of the execution of the one or more action plans, wherein the optimal reward is achieved based on a comparison of a variance of mean rewards of the one or more action plans over a window of pre-defined number of iterations and a pre-defined threshold and wherein the optimal reward is arrived based on one or more of (i) a desired computational complexity, (ii) a desired memory footprint, or (iii) a desired performance metric.

In an embodiment, the method further comprises learning one or more costs for each of the one or more actions being executed to perform the one or more sub-tasks.

In an embodiment, the method further comprises updating the one or more costs in the associated computer vision knowledge base.

In an embodiment, each of the one or more actions has one or more associated preconditions and one or more associated effects.

In another aspect, there is a system for composable workflow for machine vision. The system comprises: a memory storing instructions; one or more communication interfaces; and one or more hardware processors coupled to the memory via the one or more communication interfaces, wherein the one or more hardware processors are configured by the instructions to: obtain an input comprising one or more input images and an input query, wherein the input query is one of a text description, a speech signal, or an annotated image; convert the input query to one or more goal states; create a problem specification file in domain specific language based on (i) one or more initial states, (ii) one or more goal states and (iii) one or more characteristics associated with the one or more input images, and initialize the created problem specification file; create a computer vision domain library based on an associated computer vision knowledge base, wherein the associated computer vision knowledge base comprises a computer vision knowledge structure to represent directory of one or more objects, one or more object types, one or more visual representation categories, one or more image attributes, one or more system states, and a plurality of computer vision algorithms for execution of one or more actions; automatically generate, via a planner, one or more action plans comprising a corresponding computer vision task workflow 'T' to be executed in a computer vision-based application environment by stitching the one or more actions comprised in the computer vision domain library to reach the one or more goal states (e.g., final goal states) specified in the problem specification file, wherein each of the one or more action plans comprises the computer vision task workflow 'T' to be executed, wherein the computer vision task workflow 'T' comprises one or more sub-tasks, wherein each of the one or more action plans are generated either deterministically or probabilistically, and wherein the step of generating one or more action plans comprises a probability of success in execution of the one or more action plans; execute the generated one or more action plans by executing the plurality of computer vision algorithms and the one or more actions comprised therein, wherein the step of executing the plurality of algorithms comprises sending an output from one computer vision algorithm to another computer vision algorithm; iteratively perform, until an optimal reward is reached: monitoring, via a reinforcement learning technique, the one or more actions associated with each of the one or more algorithms to determine a change in one or more states; and calculating, via the reinforcement learning technique, a cost for each of the one or more actions based on the change in the one or more states, wherein a reward is achieved by executing actions in the one or more action plans, wherein the reward is calculated either at the execution of each action in the one or more action plans or at the end of the execution of the one or more action plans, wherein the optimal reward is achieved based on a comparison of a variance of mean rewards of the one or more action plans over a window of pre-defined number of iterations and a pre-defined threshold and wherein the optimal reward is arrived based on one or more of (i) a desired computational complexity, (ii) a desired memory footprint, or (iii) a desired performance metric.

In an embodiment, the one or more hardware processors are further configured by the instructions to learn one or more costs for each of the one or more actions being executed to perform the one or more sub-tasks.

In an embodiment, the one or more hardware processors are further configured by the instructions to update the one or more costs in the associated computer vision knowledge base.

In an embodiment, each of the one or more actions has one or more associated preconditions and one or more associated effects.

In yet another aspect, there are provided one or more non-transitory machine-readable information storage mediums comprising one or more instructions which when executed by one or more hardware processors cause a method for composable workflow for machine vision by obtaining, via one or more hardware processors, an input comprising one or more input images and an input query, wherein the input query is one of a text description, a speech signal, or an annotated image; converting the input query to one or more goal states; creating, via the one or more hardware processors, a problem specification file in domain specific language based on (i) one or more initial states, (ii) one or more goal states and (iii) one or more characteristics associated with the one or more input images, and initializing the created problem specification file; creating, via the one or more hardware processors, a computer vision domain library based on an associated computer vision knowledge base, wherein the associated computer vision knowledge base comprises a computer vision knowledge structure to represent directory of one or more objects, one or more object types, one or more visual representation categories, one or more image attributes, one or more system states, and a plurality of computer vision algorithms for execution of one or more actions; automatically generating, via a planner executed by the one or more hardware processors, one or more action plans comprising a corresponding computer vision task workflow 'T' to be executed in a computer vision-based application environment by stitching the one or more actions comprised in the computer vision domain library to reach the one or more goal states (e.g., final goal states) specified in the problem specification file, wherein each of the one or more action plans comprises the computer vision task workflow 'T' to be executed, wherein the computer vision task workflow 'T' comprises one or more sub-tasks, wherein each of the one or more action plans are generated either deterministically or probabilistically, and wherein the step of generating one or more action plans comprises a probability of success in execution of the one or more action plans; executing the generated one or more action plans by executing the plurality of computer vision algorithms and the one or more actions comprised therein, wherein the step of executing the plurality of algorithms comprises sending an output from one computer vision algorithm to another computer vision algorithm; iteratively performing, until an optimal reward is reached: monitoring, via a reinforcement learning technique, the one or more actions associated with each of the one or more algorithms to determine a change in one or more states; and calculating, via the reinforcement learning technique, a cost for each of the one or more actions based on the change in the one or more states, wherein a reward is achieved by executing actions in the one or more action plans, wherein the reward is calculated either at the execution of each action in the one or more action plans or at the end of the execution of the one or more action plans, wherein the optimal reward is achieved based on a comparison of a variance of mean rewards of the one or more action plans over a window of pre-defined number of iterations and a pre-defined threshold and wherein the optimal reward is arrived based on one or more of (i) a desired computational complexity, (ii) a desired memory footprint, or (iii) a desired performance metric.

In an embodiment, the method further comprises learning one or more costs for each of the one or more actions being executed to perform the one or more sub-tasks.

In an embodiment, the method further comprises updating the one or more costs in the associated computer vision knowledge base.

In an embodiment, each of the one or more actions has one or more associated preconditions and one or more associated effects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
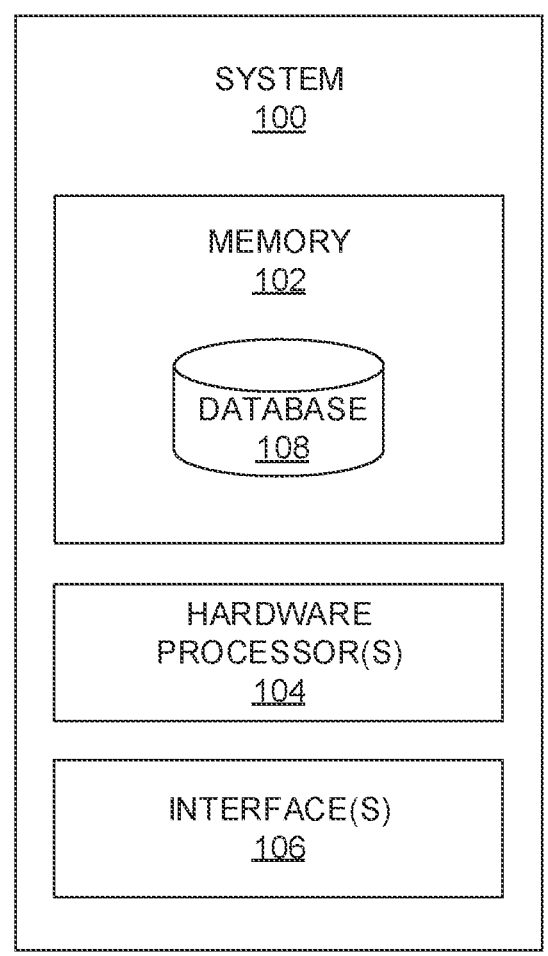
FIG. 1 illustrates an exemplary block diagram of a system for dynamically generating composable workflows for machine vision applications, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Pattern recognition involves expert-guided algorithm selection at various stages of the solution workflow. For instance, pattern recognition in computer vision solutions is solved in different stages that include data transformation, pre-processing, region of interest detection, object detection, and metrology algorithms. Further, these stages may not be used in any specific order. Besides, there exist multiple workflows that can yield good results under different constraints and the choice amongst those is critical for building an automatic workflow synthesis system.

Automation of workflow synthesis enables in mitigating this challenge. The functionality of such an automation system is to reach the desired goal given the initial conditions (images in the context of machine vision). For a realistic machine vision workflow synthesis platform, the challenge needs to be addressed hierarchically: firstly, the system should be able to select applicable stages to achieve a goal. For each stage selected, an appropriate algorithm needs to be selected. Further, for each algorithm, the correct parameters need to be chosen. When working in an environment with multiple options, steps, and configurations, automation can help in increasing productivity and reducing costs.

A basic feature of an autonomous system is the ability to intelligently perform tasks based on high-level goals. In literature, planners are predominantly used in robotic navigation literature while creating such autonomous systems. However, In the case of robotics and robotic navigation, the choice that the robot must make are limited compared to computer vision algorithm selection. There are several ways to recommend image processing workflows, each having advantages and disadvantages of its own. Four possible approaches are discussed below. The naivest way is to randomly pick algorithms from the set of all possible algorithms and stages available in the domain library. This raw machine-driven composition of algorithms is highly unproductive and ineffective. A template-based system, which is a deterministic rule-based engine that guides a human developer to build the workflow is the second variant. Here, templates are manually created in an offline manner and the system chooses the task template for the workflow generation. The obvious drawback of this approach is that the system does not have evolutionary properties. Once a specific algorithm is chosen for a sub-task, this is hardcoded as a rule. A new goal-driven solution cannot be synthesized as the goal space is restricted to the goals already present in the template. Also, since the workflow recommendations are template-based, the system recommends a single match workflow and there is no indication of the success of the proposed workflow.

The template-based solution is more systematic than random and improves the level of success substantially over random workflow generation. To overcome the abovementioned drawbacks, a knowledge-driven framework is needed that can automatically synthesize goal-driven workflows. Symbolic AI planning or planner-based systems are organized for architectural way of representing rich knowledge structures. Domain knowledge representation is more structured in terms of objects, attributes, states, actions/algorithms with its preconditions (input behavior) and effects (output behavior). All these combined help in formulating a planning problem. Initial state and goal propositions are defined in a problem specification file whereas state predicates, action preconditions and effects are defined in the domain library. The image features, based on which appropriate algorithms result in desired states, are judiciously described in the domain library. The planner generates an algorithm sequence (plan) using the domain library and the input problem. This however results in plans that are not robust to environmental changes and uncertainties defined in the domain representation. Again, these systems cannot continuously evolve as new workflows are generated. To eliminate the drawback of static planners, learning mechanisms need to be incorporated that can dynamically assess the environment to achieve optimal goal-driven workflows. Reinforcement Learning (RL) based solutions tackle this problem by defining the Markov Decision Process that can synthesize the optimal workflow by maximizing reward (an indicator of success) through trial and error.

Artificial Intelligence (AI) planners can be seen as a program that searches for an action sequence to generate a solution (consistent plan) for achieving the goal from the current state. Planning in robotics is a rapidly developing area. Beginning with the first International Planning Competition in 1998 there has been proliferation of planning techniques and planners such as heuristic-based planners, temporal planners, SAT-based planners, and planners that can handle external events and non-linear constraints, etc. Broadly, there are two different kinds of planning: domain-dependent or domain-specific and domain-independent planning. In the case of domain-independent planning, generic representations and techniques are used to solve the generic planning problem based on basic principles. The same algorithms can be reused for different tasks and there is no need to reinvent the same technique for different problems, thereby saving efforts. In computer vision automation, domain independent planning is used since the aim is to automate the process of generation of image processing workflow for any general computer vision task. In such cases, domain knowledge plays a vital role.

Knowledge base is an integral part of all autonomous architectures. Knowledge base should include descriptions of image processing domain, object of interest, attributes, action requirements and effects, algorithmic implementations and resource or capabilities descriptions integrated to perform tasks. Domain Knowledge is modeled using property graphs that maintain relationships between data in a graphical form. Property graphs are attributed, labeled, directed graphs. The property graph modeling approach provides the capability to reuse information across multiple autonomous system deployments including robotics. There exist several works in literature that discuss about the kinds of image processing concepts and representation of those in the form of ontology for various applications. In addition to knowledge representation, reasoning mechanism is of paramount importance when developing image processing applications. The commonly used logics for reasoning such as answer set programming (ASP) and its extensions like P-log, Problog, and LP-MLN allow expression of probabilistic uncertainty, weights, and contradictory information to various degrees. Another class of logic, which can be used to describe the domain is Planning Domain Definition Language (PDDL) and its extensions, PDDL+, NDDL, MAPL, OPT, PPDDL, APPL, RDDL and MA-PDDL. The extensions allow defining probabilistic uncertainty and weights of domain actions. Amongst PDDL and ASP, PDDL is designed for task planning problems with longer solutions and ASP is designed for knowledge-intensive reasoning tasks with a large number of objects. Therefore, to generate complex image processing workflows, the present disclosure employs PDDL or something similar as a domain definition language (e.g., symbolic planning).

There have been initial attempts to automate the machine vision workflow targets specific applications. For instance, one of the research works proposed a system for the automatic construction of video processing solutions. Another research work discussed four categories of expert systems that use image processing knowledge to compose image analysis processes namely—consultation, knowledge-based program composition, goal-directed and rule-based design system for image segmentation tasks. All these systems require rules to represent image processing knowledge which is hard to describe in terms of image quality, shape features and spatial relations. Further, due to the absence of evaluation methods, most of the systems have an expert in the loop. Yet another research work proposed a knowledge-rich problem-solving system that is used for automatic generation of image processing programs. Similarly, a further research work proposed a system that expresses domain knowledge in the form of object models and a set of rules which codify the template selection criteria. Such rule-based knowledge-driven systems can only succeed in solving problems corresponding to well-identified tasks. Ideally, the system should be able to discover new solutions to problems that have never been tackled before. Conventionally, research works developed a system that can adapt the solutions based on changing requirements by learning from goal-directed feedback. The feedback signal is the difference between the produced output and a given goal. In this case, the rule base provides the configuration of steps and all the goal specifications needs to be defined beforehand. To handle the above-mentioned challenges, the present disclosure combines symbolic planning for solution synthesis and discovery aided by reinforcement learning (RL) for adaptation by maximizing the overall workflow reward.

For automation, integration of symbolic planning and RL can be used such that they mutually benefit each other. This is exploited by the present disclosure in synthesizing robust plans for the computer vision domain. More specifically, system and method of the present disclosure use ontology for representing image processing domain knowledge which introduces vocabulary relevant to the domain and specifies intended meaning to it. The present disclosure implements a planner is implemented to solve the planning problem since it can choose the optimal action sequence optimizing overall plan cost. Further, the cost of each action is learned by the Q-Learning agent executed by system of the present disclosure.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates an exemplary block diagram of a system for generating composable workflows for machine vision applications, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information pertaining to one or more input images and an input query corresponding to machine vision application/environment, image processing algorithms, etc. In an embodiment, the memory 102 may store the one or more technique(s), the one or more reinforcement learning technique(s), which are executed by the one or more hardware processors 104 to perform the methodology described herein. The technique(s), for example, may comprise but are not limited to problem specification file creator, computer vision domain library creator, fuzzy image characteristic classifier, planner, execution module, learning and monitoring units, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
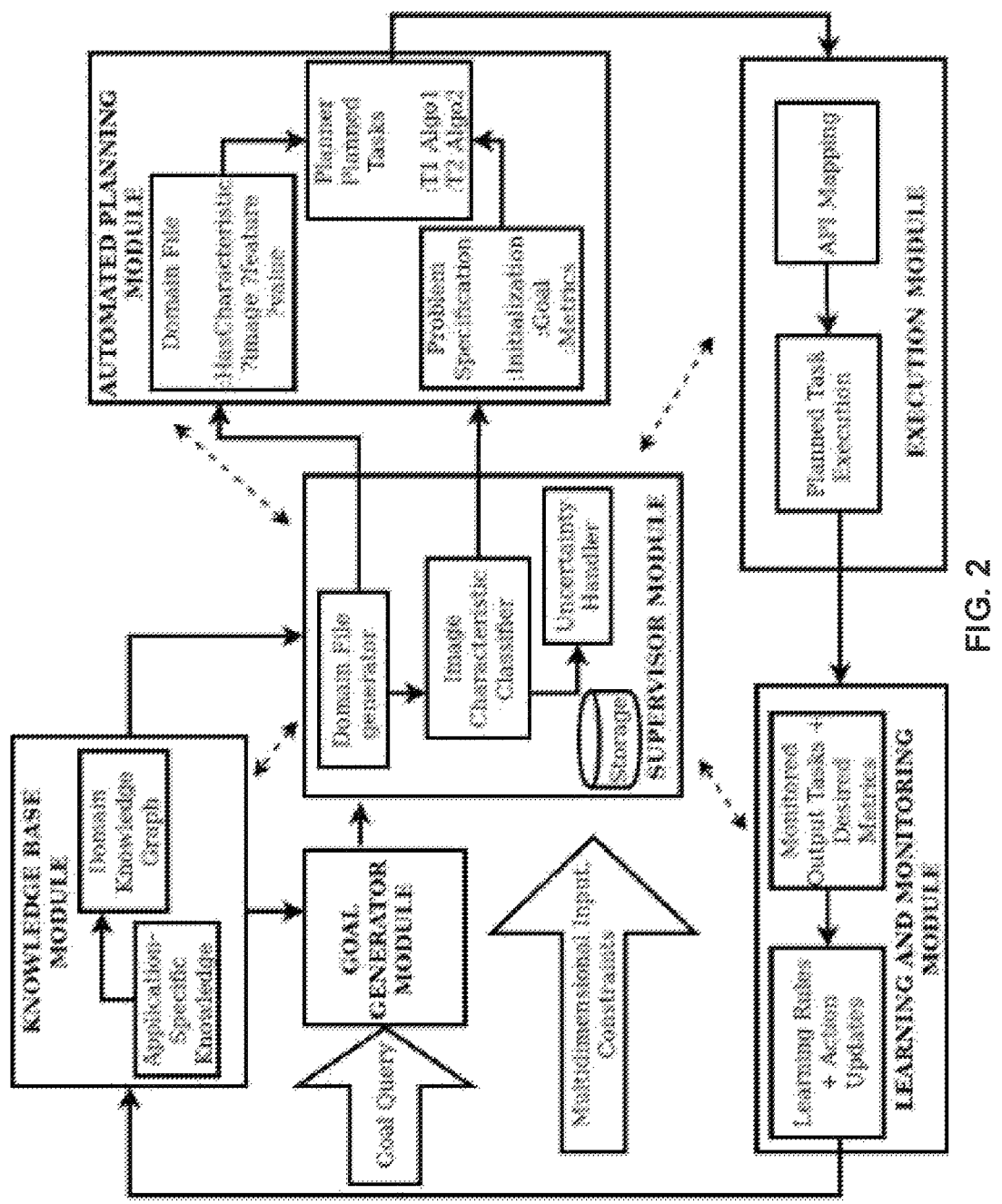
FIG. 2 illustrates an exemplary functional block diagram of the system of FIG. 1 for generating composable workflows for machine vision applications, in accordance with an embodiment of the present disclosure.

FIG. 2 illustrates an exemplary functional block diagram of the system of FIG. 1 for dynamically generating composable workflows for machine vision applications, in accordance with an embodiment of the present disclosure. The functional block diagram of the system as shown in FIG. 2 comprises a knowledge base module (also referred as knowledge base and interchangeably used herein), a supervisor module (also referred as supervisor or cognitive supervision module and interchangeably used herein), a goal generator module, an automated planning module (also referred as planner and interchangeably used herein), an execution module, and a learning and monitoring module.

Figure 3:
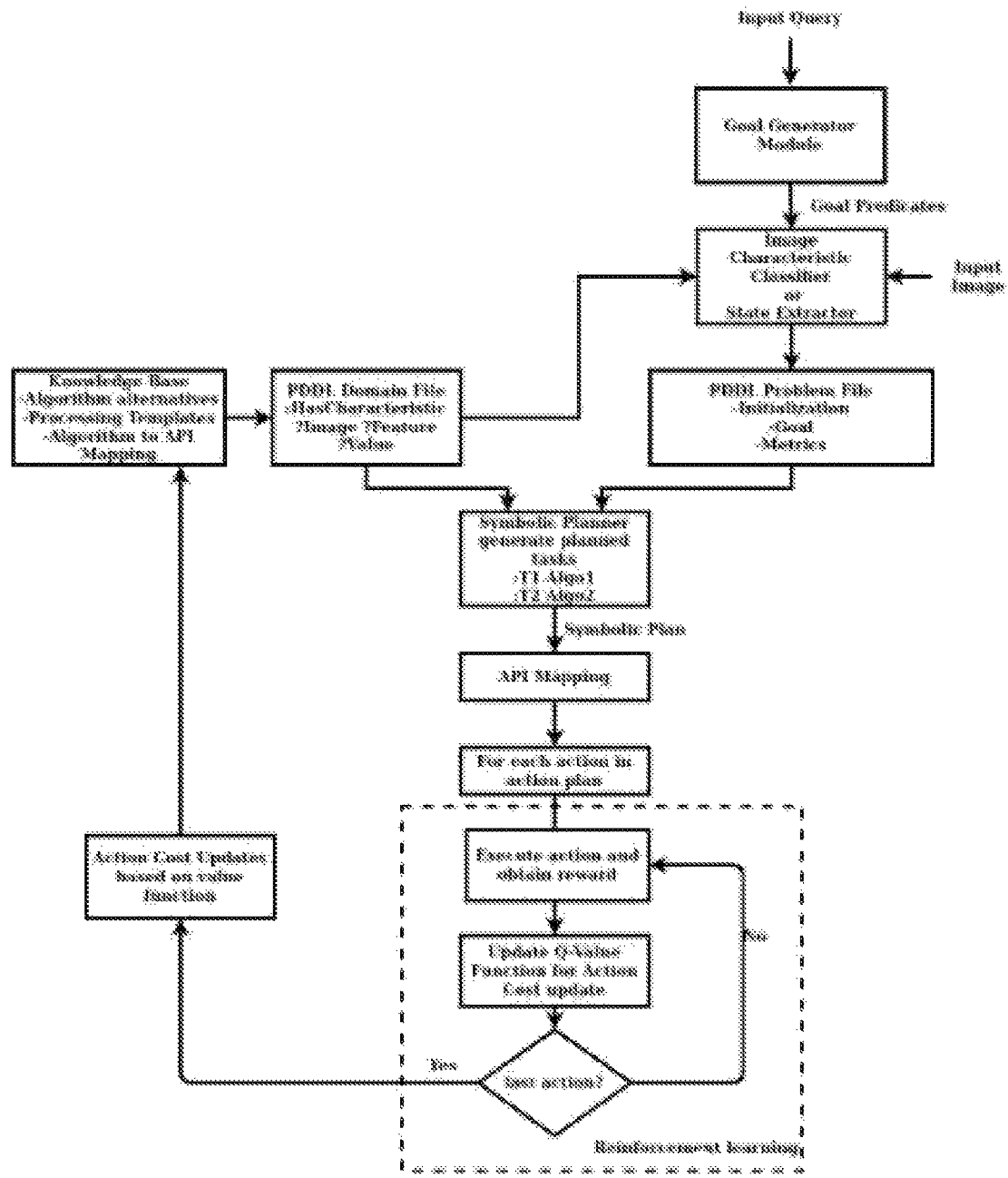
FIG. 3 illustrates an exemplary functional flow-diagram for dynamically generating composable workflows for machine vision applications, in accordance with an embodiment of the present disclosure.

FIG. 3, with reference to FIG. 1, illustrates an exemplary functional flow-diagram for dynamically generating composable workflows for machine vision applications, in accordance with an embodiment of the present disclosure.

Figure 4A:
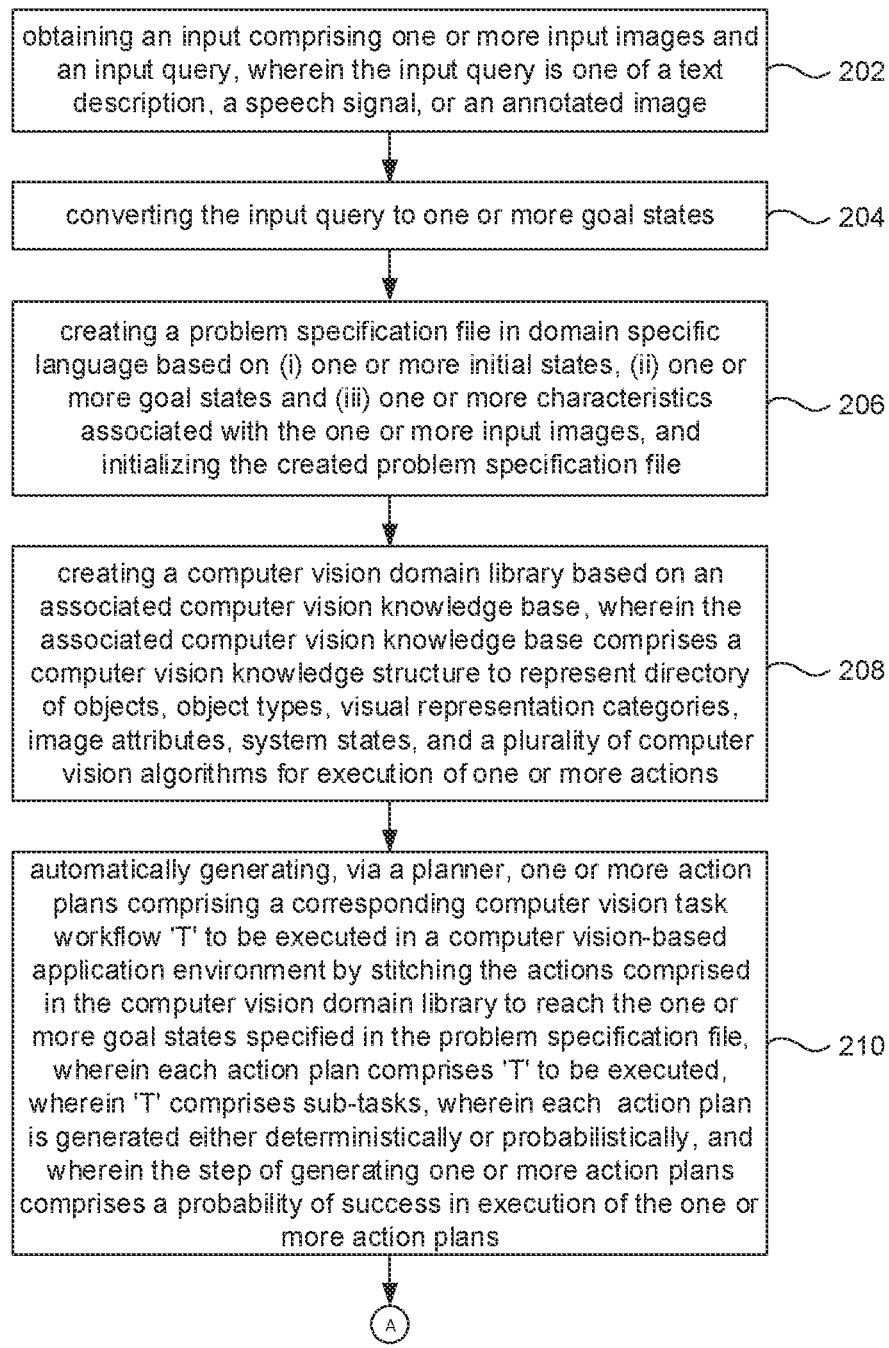
FIGS. 4A and 4B illustrates an exemplary flow diagram of a method for dynamically generating composable workflows for machine vision applications, using the system of FIG. 1, in accordance with an embodiment of the present disclosure.
Figure 4B:
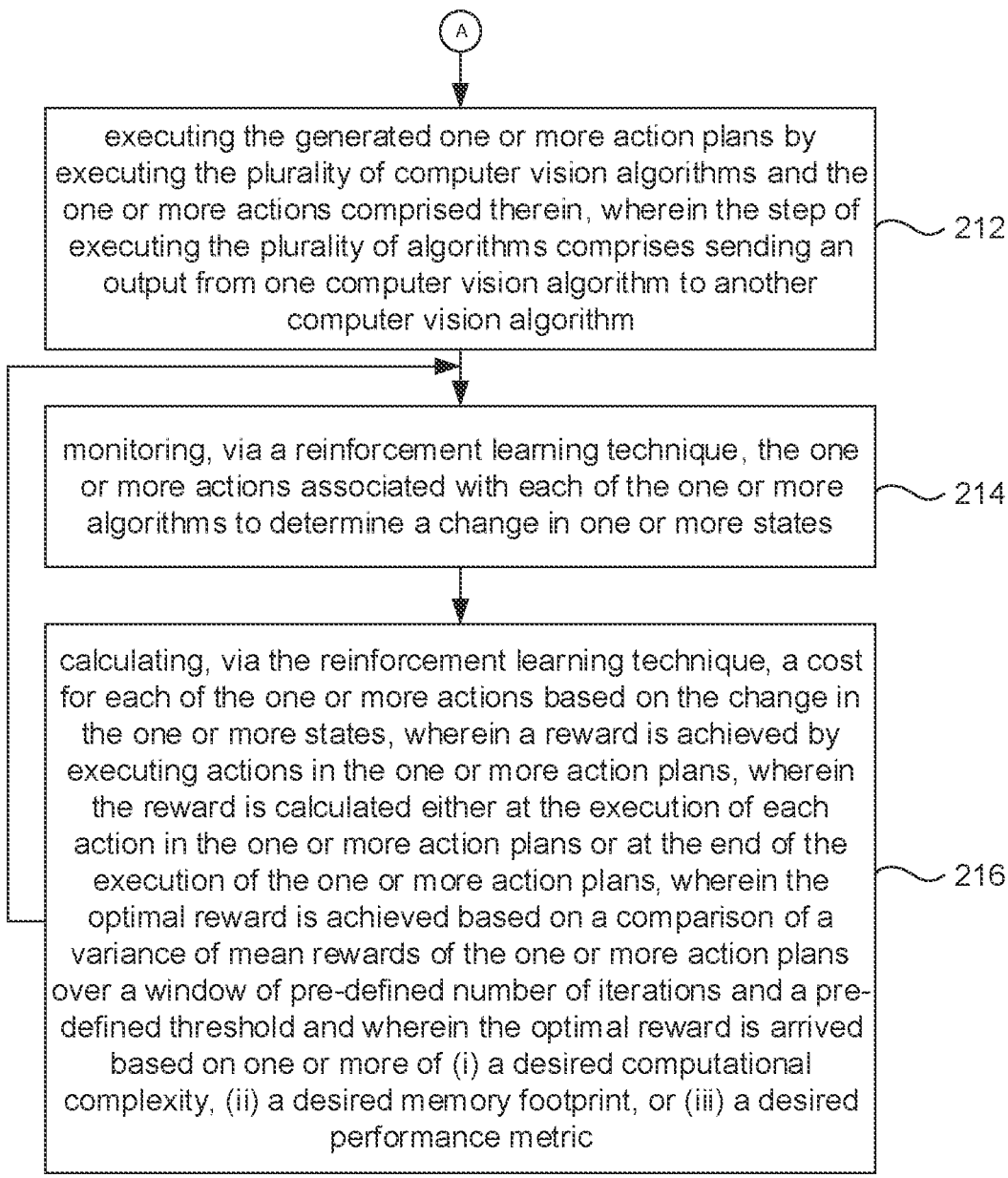

FIGS. 4A and 4B, with reference to FIGS. 1-3, illustrates an exemplary flow diagram of a method for dynamically generating composable workflows for machine vision applications, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIGS. 1-2, the flow diagram of FIG. 3 and the graphical representation of FIG. 5. In an embodiment of the present disclosure, at step 202, the one or more hardware processors 104 obtain an input comprising one or more of: one or more multi-dimensional input (e.g., 2D or 3D images/depth image(s), video(s), and the like) and an input query, wherein the input query is one of a text description, or a speech signal or an annotated image. Consider a scenario of a retail store in which people are shopping in multiple zones such as Zone A, Zone B, Zone C, etc. It is to be noted that the template of zones is predefined and known, in one example embodiment. In the exemplary applications as referred by the present disclosure, zone analysis of Zone A and Zone B is performed. The applications may include security and theft detection; shelf optimization by object counting, logo detection, product clustering, and the like; footfall analytics to understand customer demographics, entry and exit patterns, customer satisfaction level, heatmap analysis, etc. Another instance may comprise wherein the input may be an input image of one or more zones (e.g., say zone A and zone B) and the input query, for example, say is 'What is the density of people in Zone B and how does it compare with Zone A in terms of people count?'. Another exemplary query may be "Study the behavior of Customer A based on demographics, path travelled, and queue waiting time to enhance customer experience". For the sake of brevity, images of zones are not shown in FIGS. It is to be understood by a person having ordinary skill in the art or person skilled in the art examples of such input images, input query, and applications discussed herein shall not be construed as limiting the scope of present disclosure. In an embodiment of the present disclosure, at step 204, the one or more hardware processors 104 convert the input query to one or more goal states. In an embodiment, the system comprises a goal generator module that converts the input query to one or more goal states. For instance, the above example specified at step 202 is considered. System and method of the present disclosure implemented a natural language processing (NLP) engine (comprised in the memory 102) using part of speech identification models or other keyword identification model, and identified keyword such as density, people, Zone B, compare, Zone A, count, and the like. Based on the predicate mapping it maps the phrases or keywords to respective predicates or object types/entities. For example, the goal states comprise (a) heatmap_generated 'Zone B', (b) regions_compared 'Zone A', 'Zone B', 'count', and the like.

At step 206 of the present disclosure, the one or more hardware processors 104 create a problem specification file in a domain specific language based on (i) one or more initial states, (ii) one or more goal states and (iii) one or more characteristics associated with the one or more input images and initializes the created problem specification file. Goal predicates and input image are obtained for the specific machine vision environment as described in step 202. This input image is fed to fuzzy image characteristic classifier (comprised in the memory 102) to extract initial states. In addition to input image, the reference images can also be provided to supplement the specification of the task. The reference image can be a representation of the complete result (segmented image) or a sample of the result (contour or region sample) or the template image. For example, the templates for Zone A and Zone B can also be provided.

The problem specification file is created for the planner that defines initial condition and goals. Below illustrates the problem specification file for the above example specified in step 202.

Problem Specification File:

```
(define (problem PROBLEM_1)
(:domain xvision
(:objects
   shopping_image - image_name
   image - image_type
   exposure noise blur available allocated detected class - image_attribute
   high medium low true false correct under over - attribute_value
   zoneA zoneB zoneC restrictedArea queueRegion - region
   people face vehicle thing - class
   CustomerA CustomersB CustomerC - face
   gender age - demographics
   perimeter area length count height time - param
   texture color pose direction emotion - appearance
   contour boundingBox tracks - shape3)
(:init
   (image available_attribute shopping image image available true)
   (image_attributes shopping_image exposure)
   (attribute_values exposure under)
   (image_attributes shopping_image noise)
   (attribute_values noise high)
   (image_attributes shopping_image blur)
   (attribute_values blur false)
   (image_template_available zoneA template available true)
   (image_template_available zoneB template available true)
   (= (total-cost) 0))
(:goal
```

-continued

```
    (and
      (heatmap_generated zoneB)
      (regions_compared zoneA zoneB count)))
  (:metric
    minimize (total-cost)))
(define (problem PROBLEM_2)
  (domain xvision
  (:objects
    shopping image - image_name
    image - image_type
    exposure noise blur available allocated detected class - image_attribute
    high medium low true false correct under over - attribute_value
    zoneA zoneB zoneC restrictedArea queueRegion - region
    people face vehicle thing - class
    CustomerA Customers CustomerC -face
     gender age - demographics
    perimeter area length count height time - param
    texture color pose direction emotion - appearance
    contour boundingBox tracks - shape3)
  (:init
    (image_available_attribute shopping_image image available true)
    (image_attributes shopping_image exposure)
    (attribute_values exposure under)
    (image_attributes shopping_image noise)
    (attribute_values noise high)
    (image_attributes shopping_image blur)
    (attribute_values blur false)
    (image_template_available queueRegion template available true)
    (=(total-cost) 0))
  (:goal
    (and
      (demographics_obained CustomerA)
      (path_generated CustomerA)
      (time_calculated CustomerA queue)))
  (metric
    minimize (total-cost)))
```

In an embodiment of the present disclosure, the cognitive supervision module comprised in the system is invoked. The cognitive supervision module regulates every element of the recommendation system to make the system goal-driven and fully automated. It handles critical duties of decision-making, feature/state extraction, reconfiguration of policies, detection of run-time inconsistencies and deployment of other modules. It creates the problem specification file for the planner that includes the initial state, the goal state and the image characteristics. The input image is fed to a fuzzy image characteristic classifier (comprised in the system—not shown in FIGS.) to extract the initial states which ensure that state space is discrete since symbolic planner uses first-order predicate logic. The reference images can also be used to supplement the specification of the task. It qualifies whether a goal can be reached with the current repository of algorithms or needs human intervention for additional knowledge. It also creates a computer vision domain library, using the symbolic planner, with the help of a knowledge base module. It monitors the execution of the planner by calling the execution module and the learning and monitoring module. If the learning and monitoring module detects the state which was not expected, then the supervisor alerts the planning module which can enforce reconfiguration of the plan accordingly. Thus, the supervisor module allows the system to be fully automated by invoking the required modules and by coordinating appropriate modules.

Post creation of the problem specification file, at step 208 of the present disclosure, the one or more hardware processors 104 create a computer vision domain library based on an associated computer vision knowledge base. The knowledge base comprises a computer vision knowledge structure to represent directory of one or more objects and associated object types, one or more visual representation categories, one or more image attributes, one or more system states and a plurality of computer vision algorithms for execution of one or more actions wherein the actions are stored in the computer vision domain library. In the present disclosure, the system 100 creates the computer vision domain library based on the knowledge available in knowledge base.

The knowledge base module (or the knowledge base represents abstract knowledge of the computer vision domain. The image processing knowledge base can be organized as multiple levels. Physical Level describes different kinds of image acquisition platforms, functions, and attributes. The perception level is concerned with the visual representation of the image content. Constraint Level defines the properties of the image which helps the planner to choose the appropriate algorithm for image processing. These constraints are used to define state space for the problem. Semantic level concepts describe objects of interest individually and specify spatial relationships between the objects. In the Task level, the goal is specified by a task with a related network of constraints. The knowledge base gives features that can classify image spaces. A structure for feature representation and problem definition is provided using symbolic planning. Better the domain knowledge, the larger is the state space.

For instance, an exemplary knowledge base may include knowledge as below:
 (a) Hierarchy of objects and object types: For instance, image(s), video objects have properties like regions, object class, shape, appearance, QuantificationParameters, etc. Further at another level, Zone A, Zone B, Zone C, Restricted Area, Queue Region etc. are the entities of object type regions. Object class type can have face, person, vehicle, etc., as its objects. Shape can have properties such as contour, bounding box, tracks, geometric which can further be line or polygon. Appearance can have properties such as texture, color, pose, direction. QuantificationParameters can also be included in knowledge base such as centroid, perimeter, area, height, length, count, feature, etc. These objects and object types also depend on application specific knowledge. For e.g., for manufacturing objects may include machine, tool, nut, bolt, etc.
 (b) Knowledge Graph describing common (sense) knowledge relevant to computer vision domain. For e.g., image has attributes such as exposure, blur, noise, illumination, colormap, etc. These image attributes can have multiple attribute values. For e.g., exposure can have values such as under, over, correct. Similarly, object can have attribute such as object size having attribute value small, medium, and large. The detailed knowledge graph is (not shown in FIGS.).
 (c) States are described by meaningfully combining one or more object types having Boolean values. States are defined using knowledge graph and predicates defined in computer vision domain library. For e.g., Heatmap_generated region, region_compared region1 region2 quantificationParameters, region_extracted region, object_detected objectClass, object counted objectClass, object_tracked objectClass, plot image shape, demographics_obained face, path_generated face, time_calculated face region, etc.
 (d) Actions define behavior of each of the functions or algorithms that include input parameters, preconditions, effects, etc. Effects or outcomes can be associated with cost metric representing performance aspect and probabilities specifying non-deterministic nature of operations. The examples of algorithms are Detect_o- bject('ObjectClass'), Detect_pose('ObjectClass'), Filter_object('ObjectClass', 'Appearance'), Face_Verification('face', 'FaceID'), Identify_Demographics ('FaceID'), Count_object('ObjectClass'), Track_object ('ObjectClass'), Plot_heatmap('Image', 'Tracks'), Plot_path ('image', 'track'), Extract_region('image', 'region_template'), Recognize_Identity('Object Class'), Region_properties('QuantificationParameters'), Calculate_time('FaceID', 'param') Deblurring ('image'), Exposure_Correction('image'), Denoising ('image'), Resizing('image'). etc. These are few actions which can solve multiple problems in retail domain. All these algorithms can have multiple options available. For eg. Detect_object can have multiple algorithm options available like SSD, YOLO, R-CNN or machine learning based algorithms based on SIFT, HOG or HAAR features for object detection. Similarly, the Track_object action can have multiple options available such as KLT Tracking, Correlation Tracking, Kalman filter based Tracking, Mean shift tracking, etc. The performance of all these varies with the kind of objects to be detected or tracked and other image attributes. By monitoring the execution, the performance of algorithms is recorded, and cost metric is updated in knowledge base by learning and monitoring the actions. Also, algorithms can be applied on set of instances stored in the memory 102 which collect statistics and estimate the probability of success of that algorithm which can be updated in knowledge base as action probabilities. Also, preprocessing algorithms can be recommended by the planner comprised in the system 100 based on the input state of image given by fuzzy image characteristics classifier. All these algorithms are reusable and general and can be used for multiple applications.

(e) Software Implementations of all the algorithms and mapping to the corresponding actions. Using the above information from (a) through (e), the computer vision domain library is created, in one example embodiment.

The system ensures that it adequately has sufficient actions to achieve goal by interacting with knowledge base and planner. If the planner suggests that actions are insufficient to reach goal state, the system 100 prompt (e.g., a user may be notified) that knowledge is insufficient. But if the planner gives the plan, then the system 100 invoke execution module. It also stores information related to task execution that can be used in continuous improvement of solution such as calculating statistics and estimating probabilities for effects of action. It also handles uncertainties in state in case monitoring module is observing states partially or image extractor gives incomplete state representation. A highly probable value may be assigned to a state or may be try with all the possible states. Below Table 1 illustrates creation of computer vision domain library (also referred as domain file and interchangeably used herein).

TABLE 1

| Steps | | Example | |
|---|---|---|---|
| 1 Description | Select the domain name | | |
| Input | domain_name = Userinput( ) | | domain_name = xvision |
| Process | Fill the domain name in given syntax: (define (domain <domain_name>)) | | |
| Output | Initialize the computer vision domain library along with predefined requirements initialized | | (define (domain xvision) (:requirements:equality :conditional-effects :fluents :action-costs :disjunctive-preconditions) |
| 2 Description | Identify fundamental data types from knowledge graph. The node on which "isA" or "isAn" edge is pointing to, will be datatype. | | |
| Input | Knowledge graph | | |
| Process | if Edge(ParentNode, ChildNode)="isA" or Edge(ParentNode, ChildNode)="isAn": type_i = Value(ChildNode) | | |
| Output | (:types <type_1> <type_2>...<type_n>) | | (:types image__name image_type image_attribute attribute_value algorithm function region param) |
| 3 Description | Define constants with their corresponding data-type. The nodes which are pointing to datatype node will be constants of data type. For example, Exposurecorrection isA function,SSD isAn algorithm | | |
| Input | Knowledge graph and types | | |
| Process | For each type_i in types:     If Edge(ParentNode, type_i) = "isA" or Edge(ParentNode, type_i) = "isAn":         constant_ij = Value(ParentNode) of type_i | | |
| Output | (:constants <constant_11> <constant_12>.....<constant_1o> - type_1 <constant_21> <constant_22>..... <constant_2p> - type_2 . . | | (:constants Exposure Correction Denoising Debluring ClusterAnalysis Detect Segment Tracking - function Densityclustering ActiveContourModeling SVM KLT SSD |

TABLE 1-continued

| Steps | | Example |
|---|---|---|
| | <constant_n1> <constant_n2>.....<constant_nq> - type_n) | HaarCascades BM3d MaskRCNN ExposureCorrection 1 ExposureCorrection2 - algorithm) |
| 4 | Description | Predicate Extraction (P): 1. Remove all the isAn and isA edges |
| | | 2. Obtain set of root nodes |
| | | 3. For each root node. Create tree and traverse till the leaf node and keep on defining the predicates. |
| | Input | Knowledge Graph |
| | Process | 1. If Edge(ParentNode,ChildNode)="isA" or Edge(ParentNode,ChildNode)="isAn": |
| | |    Remove Edge(ParentNode, ChildNode) |
| | | 2. Obtain set of root nodes, S=[ ] |
| | | If Incoming(Node(A))=0: |
| | |    S.append(A) |
| | | 3. For each root node r in set S: |
| | |    Obtain tree T |
| | |    Traverse till the leaf node is reached: |
| | |      Parent node = root(T) = r |
| | |      For each relation from parent node: |
| | |        Childnodes = next(r, relation) |
| | |        predicate_name = relation |
| | |        argument_type = [type(root node), type(Childnodes)] |
| | |      Parent node = next(Parent Node) |
| | Output | (:predicates (<predicate_name1> ?arg1 - <argument_type[1]> ?arg2 - sargument_type[2]> ...... ?argm - <argument_type[m]) . . . (<predicate_name> ?arg1 - <argument_type[1]> ?arg2 - sargument_type[2]> ...... ?argn - <argument_type[n]>) ) | (:predicates (available_algo ?fn - function ?algo - algorithm) (image_attributes ?i - image_name ?a - image_atthbute) (atthbute_values ?a - image_attribute ?v attnbute_value) ) |
| 5 | Description | Define functions describing the optimization criteria. Also include functions describing constraints if exist. |
| | Input | optimization_metric = UserSelect( ) constraint = UserSelect( ) | optimization_metric = total-cost constraint = total-time |
| | Process | Define algorithm specific functions for optimization_metric and constraint. | |
| | Output | (:functions (<optimization_metric>) (<constraint>) (<algo-methc> ?algo-name ?p1 ?p2 ... ?pn) (<algo-constraint> ?algo-name ?p1 ?p2 ... ?pm) ) | (:functions (total-cost) (total-time) (algo-cost ?algo ?p1 ?p2 ?p3) (algo-time ?algo ?p1 ?p2 ?p3) ) |
| 6 | Description | Action model extraction. Both the cases are discussed: |
| | | 1. with existing knowledge graph |
| | | 2. if new knowledge is to be added |
| | Input | Knowledge graph |
| | Process | Case1: From knowledge graph |
| | | For each node of type(node)==algorithm: |
| | |    algo_name = Value(node) |
| | |    parameters = [ ] |
| | |    variables = [ ] |
| | |    precondition = [ ] |
| | |    effect = [ ] |
| | |    for ChildNode in node.childNodes: |
| | |      if Edge(node, ChildNode) = "hasParam": |
| | |        parameters append(type(ChildNode)) |
| | |      if Edge(node, ChildNode) = "hasVar": |
| | |        variables. append(type(ChildNode)) |
| | |      if Edge(node, ChildNode) = "requires": |
| | |        precondition. append(Predicate(ChildNode)) |
| | |      if Edge(node, ChildNode) = "achieves": |
| | |        effects. append(Predicate(ChildNode)) |

TABLE 1-continued

| Steps | Example | |
|---|---|---|
| | Case2:<br>If new knowledge added:<br>    1. Collect the sample workflows(sequence of actions)<br>    2. For each workflow:<br>        a. Set all the predicates as False except the initial state predicates.<br>        b. For each action in workflow:<br>            1. Execute action<br>            2. Calculate value of each predicate before and after execution<br>            3. If there is change in any predicate value<br>                preconditions: initial predicate value<br>                effects: predicate change value after action execution<br>            3. Obtain probability distribution of each predicate over all possible values predicate argument can take.<br>            4. Take arg max of the distribution and obtain correct argument value of predicate for both precondition and effects. | |
| Output | Case 1:<br>(:action <algo_name><br>:parameters (?p1 - parameters[1] ?p2 - parameters[2].....?pn - parameters[k])<br>:vars (?v1 - variables[1] ?v2 - variables[2]..... ?vn - variabtes[1])<br>:preconditions (and (precondition[1]) (precondition[2]) ...... (precondition[m]))<br>:effects<br>(and (effect[1])<br>(effect[2])..... (effect[n]))) | Case 1:<br>(:action Exposure_correction<br>:parameters ( ?im - image_name ?algo – algorithm)<br>:vars (?it - image_type ?val – atthbute_value)<br><br>:precondition (and<br>(image_allocated ?im ?it)<br>(image_attribates ?im exposure)<br>(image_attributes ?im blur) (image_attributes ?im noise)<br>(attribute_values exposure ?val)) (or (= ?val over) (= ?val under))(not (= ?val normal))<br>(attribute_values noise any) (attribute_values blur any) (available_algo exposure_correction ?algo))<br>:effect(and<br>(image_attributes ?im exposure) (not (attribute_values exposure ?val))<br>(attribute_values exposure normal)<br>(increase (total-cost) (algo-cost ?algo ?val any any)))) |

Output:
Below is the part of sample the computer vision domain library:

(define (domain xvision)
(:requirements :equality :conditional-effects :fluents :action-costs :disjunctive-preconditions)
(:types image_name image_type image_attribute attribute_value algorithm function region)
(:constants
Exposurecorrection Denoising Debluring ClusterAnalysis Detect Segment Tracking - function
ActiveContourModeling KLT SSD BM3d MaskRCNN Exposurecorrection - algorithm)
(:predicates
(image_allocated ?im - image_name ?it -image_type)
(available_algo ?fn - function ?algo - algorithm)
(image_attributes ?i - image_name ?e- image_attribute)
(attribute_values ?a - image_attribute ?v - attribute_value)
)
(:functions

```
(total-cost)
(total-time)
(algo-cost ?algo ?p1 ?p2 ?p3)
(algo-time ?algo ?p1 ?p2 ?p3)
)
(:action Exposure_correction
:parameters ( ?im - image_name ?algo - algorithm)
:vars (?it - image_type ?val - attribute_value)
:precondition (and (image_allocated ?im ?it) (image_attributes ?im exposure)
(image_attributes ?im blur) (image_attributes ?im noise) (attribute_values exposure
?val)) (or (= ?val over) (= ?val under))(not (= ?val normal)) (attribute_values noise any)
(attribute_values blur any) (available_algo exposure_correction ?algo))
:effect (and (image_attributes ?im exposure) (not (attribute_values exposure ?val))
(attribute_values exposure normal) (increase (total-cost) (algo-cost ?algo ?val any any))))
```

It is to be understood by a person having ordinary skill in the art or a person skilled in the art that above example depicts only part of the computer vision domain library. In reality, the computer vision domain library may be very large and include multiple predicates, types, constants, functions and actions definitions. Example of such computer vision domain library (or domain file) shall not be construed as limiting the scope of the present disclosure. From the above computer vision domain library, it can also be observed that an action can have multiple preconditions and effects which are included in action model definition by using "and" logic.

Post computer vision domain library creation, at step 210 of the present disclosure, the one or more hardware processors 104 automatically/dynamically generate, via a planner, one or more action plans comprising a corresponding computer vision task workflow 'T' to be executed in a computer vision-based application environment by stitching the one or more actions comprised in the computer vision domain library to reach the one or more goal states (e.g., final goal states) specified in the problem specification file. In an embodiment, each of the one or more action plans comprises the computer vision task workflow 'T' to be executed. The computer vision task workflow 'T' comprises one or more sub-tasks. Further, each of the one or more action plans can be generated either deterministically or probabilistically. The step of generating one or more action plans comprises a probability of success in execution of the one or more action plans. Below description illustrates automatic generation of action plan(s). The planner comprised in the memory 102 takes the problem specification file and the computer vision domain library as input and generates a symbolic plan. In this way, the planner is given description of the state transition system that tells the planner how the image may evolve, knowledge of initial state that tells the state in which the image is in and some objectives that tells the planner about the termination condition through these files. Thus, the planner consults the computer vision domain library and problem specification files, solve the planning problem, and generates a sequence of actions to reach stated goal by finding path between initial state and goal state. The symbolic plan (or action plan(s)) are provided by way of examples as below:

| 1. | DetectObject Algo1 ('face') --------> |
| 2. | Face_Verification('face', 'Customer A') --------> |
| 3. | Identify_Demographics ('Customer A') --------> |
| 4. | Track_object Algo3 ('Customer A') --------> |
| 5. | Plot_path ('image', 'track') --------> |
| 6. | extract_region Algo1(image, queueRegion) --------> |

-continued

| 7. | Detect_object Algo2('person') --------> |
| 8. | region_properties('length') --------> |
| 9. | Calculate_time('Customer A', 'param') |

The generated action plan implicitly describes a path through state transition graph based on the given goal. As described in knowledge base there are multiple algorithm alternatives available in the computer vision domain library. Therefore, there may be multiple paths (multiple action plans). When high level goal is input the planner generates efficient action plans by decomposing the goal into atomic tasks to complete the goal task. The planner suggests one or more action plans by tracing back the state transitions needed to achieve the goal state. For e.g., to calculate waiting time of Customer A, queue properties are required to be obtained such as flow rate, etc. To calculate region properties, the precondition is to detect number of persons in the queue which gives idea about length of queue. For determining number of persons in queue, the queue region should firstly be extracted. To plot path travelled by customer, tracking is needed. To track, the customer needs to be identified first. Similarly, to find demographic customer needs to be identified first. Before verifying the face first, the planner should detect face. In this way based on preconditions and effects of actions, the state transitions are identified by the planner. The actions such as blur removal, noise removal, exposure correction, etc. may also be suggested based on the initial states defined in the problem specification file. In this case, as the initial states are already assumed to be without noise, low blur and correctly exposed therefore no pre-processing step was suggested by the present disclosure. Also, templates of queue might not be available, so planner will suggest alternative algorithm for region extraction rather than template matching (Algo1). Thus, in this way the planner synthesizes the solution by searching out appropriate state transitions from initial state to final goal state thereby handling the uncertainty in goals. It shows that proposed system does not really store re-conceived solutions. All the actions are associated with cost of execution based on its performance. The planner will choose the one optimizing the overall cost. For e.g., to detect person the planner has chosen Detect_object Algo2 whereas for face detection it recommends Detect_object Algo1.

Intelligent action planning by the planner (or the automated planning module) involves querying the knowledge base at design time, discover requirements for goal completion and updates the knowledge base. For the computer vision domain, when all the possible algorithms, the states, and their vocabulary are identified and stated in the global domain library, then it can be applied to multiple domains or applications. In this way, uncertainty in goal is handled using the planning approach. Also, there may be multiple paths (multiple solutions/plans), then one may choose the better cost solution among all possible recommendations, otherwise one may have to try all paths or solutions. Multiple paths with its corresponding cost can also be recommended by using planners such as Local search for Planning Graphs (LPG), and the like. In an embodiment, the expressions 'composable workflow' and 'action plan' refer to a composition one or more parameters comprising but are not limited to, initial goal states, final/desired goal states, problem description, various algorithms to be executed, details of task(s)/sub-task(s), series of steps to be performed, cost associated with each algorithm/task/sub-task/action, and the like. The 'composable workflow' and/or 'action plan' further includes alternative solution(s)/action plans in case a current action plan which is being executed does not meet the desired performance metric, desired computational complexity, desired memory footprint and the like. Alternative solutions include suggesting alterative algorithms for execution and carrying out a desired task/sub-task to meet the desired performance metric, desired computational complexity, desired memory footprint and the like. In an embodiment, 'composable workflow' and 'action plan' refer to the above description and may be interchangeably used herein.

At step 212 of the present disclosure, the one or more hardware processors 104 execute the generated one or more action plans by executing the plurality of algorithms and the one or more actions comprised therein. It translates the symbolic action plan to an executable code (or device-specific language), which is then executed by the execution module. The execution of the action then changes the state of the actual system e.g., image in the above example scenario. But the image is not only changed by the deterministic action's effects that are given in the computer vision domain library, but the resultant state of the image can also depend on other factors like global image attributes and local object level attributes. Thus, in each step an action API is called, and its output is monitored by Learning and Monitoring module. In an embodiment, the step of executing the plurality of algorithms comprises sending an output from one algorithm to another algorithm. In other words, the execution module sends the processed output of the previous algorithm as input to the next algorithm while executing the services and provides visualization of the effects and transformed images.

Further, steps 214 and 216 are iteratively performed, until an optimal reward is reached. For instance, at step 214 of the present disclosure, the one or more hardware processors 104 monitor, via a reinforcement learning technique, the one or more actions associated with each of the one or more algorithms to determine a change in one or more states. At step 214 of the present disclosure, the one or more hardware processors 104 calculate, via the reinforcement learning technique, a cost for each of the one or more actions based on the change in the one or more states and a reward is achieved by executing actions in one or more action plans. In an embodiment, the reward is calculated either at the execution of each action in the one or more action plans or at the end of the execution of the one or more action plans. In an embodiment, the optimal reward is achieved when variance of mean rewards of one or more action plans over a window of pre-defined number of iterations drops below a pre-defined threshold, for example 0.001. In an embodiment, the optimal reward is arrived based on one or more of (i) a desired computational complexity, (ii) a desired memory footprint, or (iii) a desired performance metric. System and method of the present disclosure conducted experiment for face detection application, wherein face detection is considered as one of the parts of the overall task plan. The performance metric achieved by the system is labeled faces in the wild (LFW) accuracy 0.9905 on CASIA-WebFace Dataset. Memory footprint observed—Size of model—for face detection execution—method consumed 185 MB and desired computational complexity achieved: Inference 30 FPS on Nvidia Quadro M4000, which were meeting the criteria.

The learning and monitoring module is responsible for making the system adaptable to state changes, action failures and addition of new knowledge. As the effects of an action are not always deterministic, it can lead to an unexpected state. The learning and monitoring module monitors this and communicates to the Cognitive Supervision Module which triggers re-planning when observed state do not conform with the expected state. The RL agent (not shown in FIGS.) comprised in the learning and monitoring module uses learned experience to update action-costs in domain knowledge (also referred as knowledge base) enabling selection of the best action at that state and making the system robust to failures. For adaptation, the integration of symbolic planning and RL agent is used. Symbolic planning can guide RL agent to efficiently explore a meaningful part of state space through one-shot plan generation using domain knowledge. The learning method is used to improve the robustness and adaptiveness of symbolic plans to handle domain uncertainty and change. To deal with action uncertainty and to learn from previous experiences, it is ensured by the system of the present disclosure that the planner exploits RL agent and revises the plans based on the weights learned during execution thereby choosing the next best algorithm for required state transition. In other words, the learning and monitoring module further handles new knowledge by exploring and revising the costs learned during its execution. Thus, the system uses learned experience to enrich the domain knowledge and improve planning which makes the system self-learning and evolutionary. The above steps 212 through 216 can be better understood by way of following illustrative example(s). A retail use case scenario is considered for better understanding of the embodiments of the present disclosure. Below are the two applications being considered.

First Application: What is the density of people in Zone B and how does it compare with Zone A in terms of people count?

Step 1: Fuzzy image characteristic classifier (comprised in the memory 102) to extract initial states wherein image characteristics of input image are extracted. Characteristics may comprise under exposed, high noise, blur absent(false), person object class, and the like.

Second Application: Study the behavior of Customer 'A' based on demographics, path travelled, and queue waiting time to enhance customer experience.

Step 1: Fuzzy image characteristic classifier to extract initial states wherein image characteristics of input image are extracted. Characteristics may comprise under exposed, high noise, blur absent(false), face object class, and the like.

Step 2: In a first iteration, problem specification file and computer vision domain library are created based on the knowledge base, input, and goal (or goal states).

Further, at step 3: action plan(s) is/are generated based on the problem specification file and computer vision domain library as illustrated in below Table 2.

TABLE 2

| For first Application | For second Application |
|---|---|
| 1. Exposure_correction Algo1('shopping image') | 1. Exposure_correction Algo1('shopping image') |
| 2. Denoising Algo3('shopping image') | 2. Denoising Algo3('shopping image') |
| 3. Extract_region Algo1 ('Zone B') | 3. Detect_object Algo1 ('face') |
| 4. Detect_object Algo2 ('person') | 4. Face_verification(face', 'Customer A') |
| 5. Count_object ('person') | 5. Identify_demographics ('Customer A') |
| 6. Track_object Algo1('person') | 6. Track_object Algo3 ('Customer A') |
| 7. Plot_heatmap(image, tracks) | 7. Plot_path ('image', 'track') |
| 8. Extract_region Algo1('Zone A') | 8. Extract_region Algo1(image, queueRegion) |
| 9. Count_object('person') | 9. Detect_object Algo2('person') |
| 10. Compare_regions ('Zone A', Zone B'). | 10. region__properties(length') |
| | 11. Calculate_time('Customer A', 'param') |

Consider initial steps of an action plan in order to show the cost updation and learning flow. The method remains same for each step. Plan recommended by the planner:
T1: Exposure_correction Algo1
T2: Denoising Algo3
T3: Detect_object Algo2
. . . .
. . . .
Tn: last_action AlgoX
Step 4: Execution: The planner performs the following:
Execute exposure correction Algo1
Update value function, Q(state, action)
Update action cost of exposure correction algo1
Execute denoising Algo3
Update value function, Q(state, action)
update action cost of denoising Algo3
Execute detection Algo2
Update value function, Q(state, action)
Update action cost of detection Algo2
. . . .
. . . .
Execute last_algorithm
Get reward based on performance metric of end task
Update value function, Q(state, action)
update action cost of last_algorithm
Step 5: Update all the action costs in the computer vision domain library
Second Iteration:
Step 3: Planner takes updated computer vision domain library and problem specification file and generate plan
Plan Recommended by planner—
T1: Exposure Correction Algo2
T2: Detect_object Algo2
. . . .
. . . .
TM: last_action AlgoY
It can be noted that while training the planner explores other options and may or may not recommend the same plan.
Step 4: Execution:
Execute exposure correction Algo2
Update value function, Q(state, action)
update action cost of exposure correction algo1
Execute detection Algo2
Update value function, Q(state, action)
update action cost of detection Algo2
Execute last algorithm
Get reward based on performance metric of end task
Update value function, Q(state, action)
Update action cost of last algorithm
Step 5: Update all the action costs in the computer vision domain library
Third Iteration:
Step 3: Planner takes updated computer vision domain library and problem specification file and generate plan
Plan Recommended by the planner—
T1: Exposure Correction Algo2
T2: Denoising Algo3
T3: Detect_object Algo1
. . . .
. . . .
TX: last_action algoX
Step 4: Execution:
Execute exposure correction Algo 2
Update value function, Q(state, action)
update action cost of exposure correction algo1
Execute denoising Algo3
Update value function, Q(state, action)
update action cost of denoising Algo3
Execute object detection Algo1
Update value function, Q(state, action)
update action cost of object detection Algo1
. . . .
. . . .
Execute last algorithm
Get reward based on performance metric of end task
Update value function, Q(state, action)
update action cost of last algorithm
Step 5: Update all action costs in the computer vision domain library.

Figure 5:
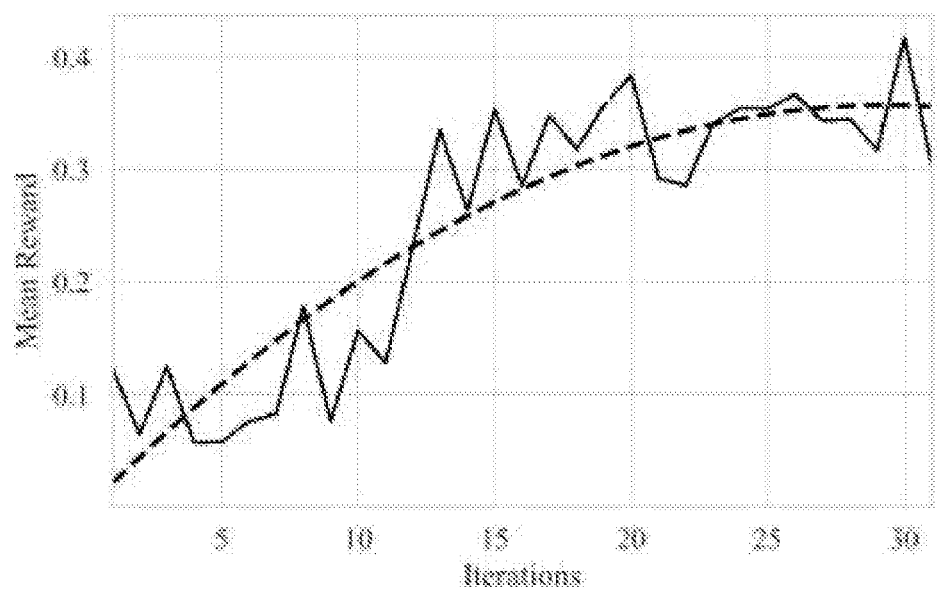
FIG. 5 depicts a graphical representation illustrating a variance of mean rewards of one or more action plans, in accordance with an embodiment of the present disclosure.

The iterations repeat till convergence is achieved (or optimal reward is achieved for the actions). The mean of rewards for the actions is depicted in FIG. 5. More specifically, FIG. 5 depicts a graphical representation illustrating a variance of mean rewards of one or more action plans, in accordance with an embodiment of the present disclosure. Here, the mean is calculated over the window of 100 iterations. Therefore, total number of iterations for this experiment is 3100.

The updation of Q-value function is based on the following equation:

$$Q^{new}(s_t, a_t) \leftarrow (1-\alpha)\underbrace{Q(s_t, a_t)}_{old\ value} + \underbrace{\alpha}_{learning\ rate}\left(\underbrace{r_t}_{reward} + \underbrace{\gamma}_{discount\ factor}\underbrace{\max_a Q(s_{t+1}, a)}_{estimation\ of\ optimal\ future\ value}\right)$$

Reward (how good the task is being performed)
Cost (indicator of how good an algorithm is to achieve given task for given input image characteristics). It is to be understood by a person having ordinary skill in the art or person skilled in the art that the above expression corresponding to Q-value function updation may vary depending upon an implementation of other RL techniques (e.g., any other value function, and the like) and such examples of RL techniques shall not be construed as limiting the scope of the present disclosure.

Embodiments of the present disclosure provide system and method to synthesize and recommend optimal computer vision workflows for a given input, goal to be achieved and the operating environment. The system of the present disclosure uses both AI planning and RL for robust, adaptive, and evolving plans. The method is demonstrated on computer vision task of object detection and segmentation in varying conditions such as contrast, noise, size of objects, etc. to prove its versatility. Based on the experiments conducted between the method of the present disclosure and template-based (not shown in FIGS) and planner without RL-based recommendation systems (not shown in FIGS) wherein the success rate of performing a given task and quality of recommended workflow by the present disclosure was observed to be greater than the other two methods by a large margin.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining, via one or more hardware processors, an input comprising one or more input images and an input query, wherein the input query is one of a text description, a speech signal, or an annotated image;
   converting the input query to one or more goal states;
   creating, via the one or more hardware processors, a problem specification file in domain specific language based on (i) one or more initial states, (ii) one or more goal states and (iii) one or more characteristics associated with the one or more input images, and initializing the created problem specification file;
   creating, via the one or more hardware processors, a computer vision domain library based on an associated computer vision knowledge base, wherein the associated computer vision knowledge base comprises a computer vision knowledge structure to represent directory of one or more objects, one or more object types, one or more visual representation categories, one or more image attributes, one or more system states, and a plurality of computer vision algorithms for execution of one or more actions;
   automatically generating, via a planner executed by the one or more hardware processors, one or more action plans comprising a corresponding computer vision task workflow 'T' to be executed in a computer vision-based application environment by stitching the one or more actions comprised in the computer vision domain library to reach the one or more goal states specified in the problem specification file, wherein each of the one or more action plans comprises the computer vision task workflow 'T' to be executed, wherein the computer vision task workflow 'T' comprises one or more subtasks, wherein each of the one or more action plans are generated either deterministically or probabilistically, and wherein the step of generating one or more action plans comprises a probability of success in execution of the one or more action plans;

executing the generated one or more action plans by executing the plurality of computer vision algorithms and the one or more actions comprised therein, wherein the step of executing the plurality of algorithms comprises sending an output from one computer vision algorithm to another computer vision algorithm;

iteratively performing, until an optimal reward is reached:

monitoring, via a reinforcement learning technique, the one or more actions associated with each of the one or more algorithms to determine a change in one or more states; and calculating, via the reinforcement learning technique, a cost for each of the one or more actions based on the change in the one or more states, wherein a reward is achieved by executing actions in the one or more action plans, wherein the reward is calculated either at the execution of each action in the one or more action plans or at the end of the execution of the one or more action plans, wherein the optimal reward is achieved based on a comparison of a variance of mean rewards of the one or more action plans over a window of pre-defined number of iterations and a pre-defined threshold and wherein the optimal reward is arrived based on one or more of (i) a desired computational complexity, (ii) a desired memory footprint, or (iii) a desired performance metric.

2. The processor implemented method of claim 1, further comprising learning one or more costs for each of the one or more actions being executed to perform the one or more sub-tasks.

3. The processor implemented method of claim 1, further comprising updating the one or more costs in the associated computer vision knowledge base.

4. The processor implemented method of claim 1, wherein each of the one or more actions has one or more associated preconditions and one or more associated effects.

5. A system, comprising:
a memory storing instructions;
one or more communication interfaces; and
one or more hardware processors coupled to the memory via the one or more communication interfaces, wherein the one or more hardware processors are configured by the instructions to:
obtain an input comprising one or more input images and an input query, wherein the input query is one of a text description, a speech signal, or an annotated image;
convert the input query to one or more goal states; create a problem specification file in domain specific language based on (i) one or more initial states, (ii) one or more goal states and (iii) one or more characteristics associated with the one or more input images, and initialize the created problem specification file;
create a computer vision domain library based on an associated computer vision knowledge base, wherein the associated computer vision knowledge base comprises a computer vision knowledge structure to represent directory of one or more objects, one or more object types, one or more visual representation categories, one or more image attributes, one or more system states, and a plurality of computer vision algorithms for execution of one or more actions;
automatically generate, via a planner, one or more action plans comprising a corresponding computer vision task workflow 'T' to be executed in a computer vision-based application environment by stitching the one or more actions comprised in the computer vision domain library to reach the one or more goal states specified in the problem specification file, wherein each of the one or more action plans comprises the computer vision task workflow 'T' to be executed, wherein the computer vision task workflow 'T' comprises one or more sub-tasks, wherein each of the one or more action plans are generated either deterministically or probabilistically, and wherein the step of generating one or more action plans comprises a probability of success in execution of the one or more action plans;

execute the generated one or more action plans by executing the plurality of computer vision algorithms and the one or more actions comprised therein, wherein the step of executing the plurality of algorithms comprises sending an output from one computer vision algorithm to another computer vision algorithm;

iteratively perform, until an optimal reward is reached;

monitoring, via a reinforcement learning technique, the one or more actions associated with each of the one or more algorithms to determine a change in one or more states; and calculating, via the reinforcement learning technique, a cost for each of the one or more actions based on the change in the one or more states, wherein a reward is achieved by executing actions in the one or more action plans, wherein the reward is calculated either at the execution of each action in the one or more action plans or at the end of the execution of the one or more action plans, wherein the optimal reward is achieved based on a comparison of a variance of mean rewards of the one or more action plans over a window of pre-defined number of iterations and a pre-defined threshold and wherein the optimal reward is arrived based on one or more of (i) a desired computational complexity, (ii) a desired memory footprint, or (iii) a desired performance metric.

6. The system of claim 5, wherein the one or more hardware processors are further configured by the instructions to learn one or more costs for each of the one or more actions being executed to perform the one or more sub-tasks.

7. The system of claim 5, wherein the one or more hardware processors are further configured by the instructions to update the one or more costs in the associated computer vision knowledge base.

8. The system of claim 5, wherein each of the one or more actions has one or more associated preconditions and one or more associated effects.

9. One or more non-transitory machine-readable information storage mediums comprising one or more instructions which when executed by one or more hardware processors cause a method for composable workflow for machine vision by:
obtaining, via the one or more hardware processors, an input comprising one or more input images and an input query, wherein the input query is one of a text description, a speech signal, or an annotated image;
converting the input query to one or more goal states;
creating, via the one or more hardware processors, a problem specification file in domain specific language based on (i) one or more initial states, (ii) one or more goal states and (iii) one or more characteristics associated with the one or more input images, and initializing the created problem specification file;
creating, via the one or more hardware processors, a computer vision domain library based on an associated computer vision knowledge base, wherein the associated computer vision knowledge base comprises a computer vision knowledge structure to represent directory of one or more objects, one or more object types, one or more visual representation categories, one or more image attributes, one or more system states, and a plurality of computer vision algorithms for execution of one or more actions;

automatically generating, via a planner executed by the one or more hardware processors, one or more action plans comprising a corresponding computer vision task workflow 'T' to be executed in a computer vision-based application environment by stitching the one or more actions comprised in the computer vision domain library to reach the one or more goal states specified in the problem specification file, wherein each of the one or more action plans comprises the computer vision task workflow 'T' to be executed, wherein the computer vision task workflow 'T' comprises one or more subtasks, wherein each of the one or more action plans are generated either deterministically or probabilistically, and wherein the step of generating one or more action plans comprises a probability of success in execution of the one or more action plans;

executing the generated one or more action plans by executing the plurality of computer vision algorithms and the one or more actions comprised therein, wherein the step of executing the plurality of algorithms comprises sending an output from one computer vision algorithm to another computer vision algorithm;

iteratively performing, until an optimal reward is reached;

monitoring, via a reinforcement learning technique, the one or more actions associated with each of the one or more algorithms to determine a change in one or more states; and calculating, via the reinforcement learning technique, a cost for each of the one or more actions based on the change in the one or more states, wherein a reward is achieved by executing actions in the one or more action plans, wherein the reward is calculated either at the execution of each action in the one or more action plans or at the end of the execution of the one or more action plans, wherein the optimal reward is achieved based on a comparison of a variance of mean rewards of the one or more action plans over a window of pre-defined number of iterations and a pre-defined threshold and wherein the optimal reward is arrived based on one or more of (i) a desired computational complexity, (ii) a desired memory footprint, or (iii) a desired performance metric.

10. The one or more non-transitory machine-readable information storage mediums of claim 9, wherein the method further comprises learning one or more costs for each of the one or more actions being executed to perform the one or more sub-tasks.

11. The one or more non-transitory machine-readable information storage mediums of claim 9, wherein the method further comprises updating the one or more costs in the associated computer vision knowledge base.

12. The one or more non-transitory machine-readable information storage mediums of claim 9, wherein each of the one or more actions has one or more associated preconditions and one or more associated effects.

\* \* \* \* \*